US012663033B2

(12) United States Patent
Fjellet et al.

(10) Patent No.: US 12,663,033 B2
(45) Date of Patent: Jun. 23, 2026

(54) HYDRAULIC COUPLING DEVICE

(71) Applicant: AKTIEBOLAGET SKF, Gothenburg (SE)

(72) Inventors: Nicklas Fjellet, Hofors (SE); Mikael Eklof, Gävle (SE); Ingemar Gustafsson, Forsbacka (SE)

(73) Assignee: AKTIEBOLAGET SKF, Gothenburg (SE)

( * ) Notice: Subject to any disclaimer, the term of this patent is extended or adjusted under 35 U.S.C. 154(b) by 296 days.

(21) Appl. No.: 18/110,608

(22) Filed: Feb. 16, 2023

(65) Prior Publication Data

US 2023/0265872 A1 Aug. 24, 2023

(30) Foreign Application Priority Data

Feb. 24, 2022 (DE) .......................... 102022201908.3

(51) Int. Cl.
*F16D 1/091* (2006.01)
*F16B 2/04* (2006.01)
*F16B 7/04* (2006.01)
(52) U.S. Cl.
CPC .............. *F16B 7/0406* (2013.01); *F16B 2/04* (2013.01); *F16D 1/091* (2013.01); *F16B 2200/89* (2023.08); *Y10T 403/1633* (2015.01)
(58) Field of Classification Search
CPC .. F16D 1/091; F16D 1/092; F16D 2001/0906; F16B 2200/89; Y10T 403/1633; Y10T 403/22
See application file for complete search history.

(56) References Cited

U.S. PATENT DOCUMENTS 3,228,102 A 1/1966 Sillett
4,202,644 A 5/1980 Soussloff
(Continued)

FOREIGN PATENT DOCUMENTS

BE 464952 A 6/1996
CN 201963755 U 9/2011
(Continued)

OTHER PUBLICATIONS

Preliminary Search Report from the French Patent Office dated Nov. 15, 2023 in related French application No. FR2301303, including Search Report and Written Opinion.
(Continued)

*Primary Examiner* — Michael P Ferguson
(74) *Attorney, Agent, or Firm* — J-TEK LAW PLLC; Scott T. Wakeman; Mark A. Ussai

(57) ABSTRACT

A hydraulic coupling device includes an inner sleeve having a tapered outer surface, an outer sleeve having a tapered inner surface mounted on the tapered outer surface of the inner sleeve, a nut screwed onto the inner sleeve, and a cylinder formed separately from the outer sleeve and secured to the outer sleeve. The cylinder abuts axially against the outer sleeve to form a joint. At least part of the nut extends into the cylinder, and the cylinder, the nut and the outer sleeve together delimit a chamber. A friction enhancing coating is provided between the cylinder and the outer sleeve and/or at least one protrusion extends from one of the outer sleeve or cylinder into a complementary recess in the other of the outer sleeve or cylinder.

20 Claims, 2 Drawing Sheets

(56) References Cited

U.S. PATENT DOCUMENTS

Figure 1:
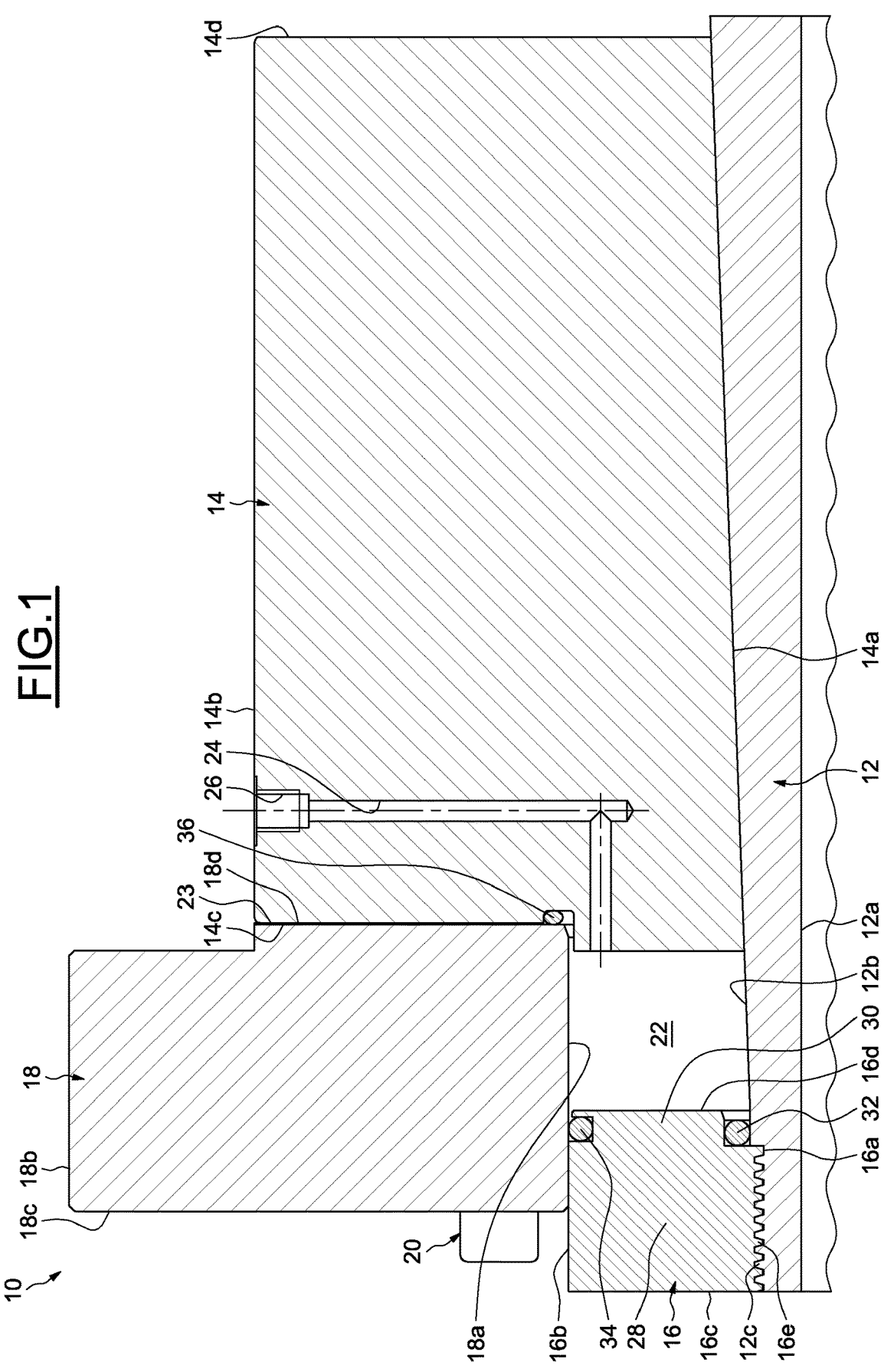

| | | | | |
|---|---|---|---|---|
| 4,425,050 A | * | 1/1984 | Durand | F16D 1/095 |
| | | | | 403/368 |
| 4,456,396 A | * | 6/1984 | Damratowski | F16D 1/092 |
| | | | | 403/34 |
| 4,525,916 A | * | 7/1985 | Wuhrer | F16D 1/05 |
| | | | | 29/446 |
| 4,863,314 A | | 9/1989 | Baugh | |
| 5,337,105 A | | 8/1994 | Vaynshteyn | |
| 2023/0265892 A1 | * | 8/2023 | Fjellet | F16D 1/05 |

FOREIGN PATENT DOCUMENTS

| | | | | | |
|---|---|---|---|---|---|
| CN | 202418272 U | | 9/2012 | | |
| CN | 213899650 U | | 8/2021 | | |
| DE | 43 20 844 | * | 1/1994 | | F16D 1/095 |
| EP | 3378577 B1 | | 11/2019 | | |
| FR | 2509815 A1 | | 1/1983 | | |
| GB | 1276547 A | | 6/1972 | | |
| GB | 1339838 A | | 12/1973 | | |
| GB | 2 225 833 | * | 6/1990 | | F16D 1/05 |
| KR | 200198198 Y1 | | 10/2000 | | |
| KR | 101318719 B1 | | 10/2013 | | |
| SE | 121560 C1 | | 2/1948 | | |
| WO | 9500767 A1 | | 1/1995 | | |

OTHER PUBLICATIONS

Preliminary Search Report from the French Patent Office dated Mar. 17, 2025 in related French application No. FR2301307, including Search Report and Written Opinion.
Unpublished U.S. Appl. No. 18/110,616.
Search Report from the British Patent Office dispatched Jun. 9, 2023 in related application No. GB2300640.6.
Examination report from related application GB2300640.6 mailed Sep. 24, 2025.

* cited by examiner

HYDRAULIC COUPLING DEVICE

CROSS-REFERENCE

This application claims priority to German patent application no. 10 2022 201 908.3 filed on Feb. 24, 2022, the contents of which are fully incorporated herein by reference.

TECHNOLOGICAL FIELD

The present disclosure is directed to the field of hydraulic coupling devices, and in particular, to hydraulic coupling devices used to create a simple connection between two shafts.

BACKGROUND

Conventionally, a hydraulic coupling device comprises a thin inner sleeve and a thick outer sleeve. The outer surface of the inner sleeve is slightly tapered, and the bore of the outer sleeve has a corresponding taper. The inner sleeve bore is somewhat larger than the diameter of the shafts to be connected so that the inner sleeve can be passed over them with ease.

The hydraulic coupling device further comprises a piston or nut screwed on the inner sleeve and delimiting together with the inner and outer sleeves a hydraulic chamber intended to be filed by oil or similar liquid. A seal is proved on the nut to avoid an escape of oil from the chamber between the nut and the inner and outer sleeves.

The coupling device is mounted by driving the outer sleeve up on the taper of the inner sleeve using oil pumped into the hydraulic chamber. This compresses the inner sleeve onto the shafts thereby creating an interference fit. When the outer sleeve has reached the correct drive-up position, the injection pressure is released and the oil connection is plugged.

With the drive-up operation, the outer sleeve is radially expanded. This impacts the initial radial clearance between the outer diameter of the nut and the outer sleeve. There is also a risk for the seal provided on the nut to be tilted which could lead to an escape of oil.

Otherwise, the outer surface of the outer sleeve may be provided with a radial flange to secure a brake disc, creating a braking function or using a drive unit. The outer surface of the radial flange may also be provided with teeth or other mechanical components.

The final machining of such outer components needs to be made with the hydraulic coupling device in mounted position by using a dummy shaft.

SUMMARY

One aspect of the present disclosure is to overcome the foregoing drawbacks.

The disclosure relates to a hydraulic coupling device comprising an inner sleeve having with a tapered outer surface, an outer sleeve having a tapered inner surface mounted on the tapered outer surface of the inner sleeve, and a nut screwed on the inner sleeve.

According to a general feature, the device further comprises a cylinder made separately from the outer sleeve and secured thereto, the nut being engaged at least in part into the cylinder. The inner sleeve, the cylinder, the nut and the outer sleeve delimit together a chamber.

According to another general feature, the cylinder is provided with a frontal face axially abutting against a frontal face of the outer sleeve.

In a first embodiment, at least one of these frontal faces is provided with a coating having a coefficient friction higher that of the frontal face.

In a second alternative embodiment, at least one of the frontal faces of the cylinder and outer sleeve comprises at least one protrusion engaged into a complementary recess formed on the other frontal face.

In a third embodiment, at least one of the frontal faces of the cylinder and outer sleeve is provided with a coating having a coefficient friction higher that of the frontal face, and at least one of these frontal faces comprises at least one protrusion engaged into a complementary recess formed on the other frontal face.

With such a design, the cylinder is less impacted by the radial expansion of the outer sleeve during the drive-up operation.

Otherwise, with the coating and/or the permanent mechanical clutch between the cylinder and the outer sleeve, the connection between these two parts enables a similar or identical torque transmission capacity as the conventional hydraulic coupling device.

If needed, the final machining of the cylinder can be made before mounting the hydraulic coupling device and therefore without using a dummy shaft.

For example, the friction coefficient of the coating may be at least equal to 0.3 and preferably at least equal to 0.45.

With such a design, it is also possible to use different materials for the cylinder and the outer sleeve, for example having different material properties. Alternatively, the cylinder and the outer sleeve may be formed from the same material but exhibit different mechanical properties. For example, the mechanical properties may vary depending on dimensions and on any heat treatment used.

The cylinder may protrude radially outwards with respect to the outer surface of the outer sleeve, for example if the cylinder comprises outer components such as a flange or teeth. Alternatively, it could however be possible for the cylinder to be radially offset inward with respect to the outer surface of the outer sleeve or flush with this outer surface.

In one embodiment, the nut comprises a main portion and a nose having a reduced outer diameter protruding axially towards the outer sleeve.

Preferably, the device comprises a first seal radially interposed between the inner sleeve and the nose of the nut, and a second seal radially interposed between the cylinder and the nose.

Alternatively, a single seal could be provided on the nut that has an inner edge in contact with the inner sleeve and an outer edge in contact with the cylinder. In this case, the nut may not include a nose. This seal could be secured to a frontal face of the nut axially facing the outer sleeve.

The device may further comprise at least one seal provided axially between the outer sleeve and the cylinder.

Advantageously, the chamber is radially defined between the tapered outer surface of the inner sleeve and the bore of the cylinder. The chamber may be axially defined between the nut and the outer sleeve.

Preferably, the outer sleeve, or the cylinder or the nut, may be provided with at least one injection conduit made into its thickness and opening into the chamber.

SUMMARY

Figure 2:
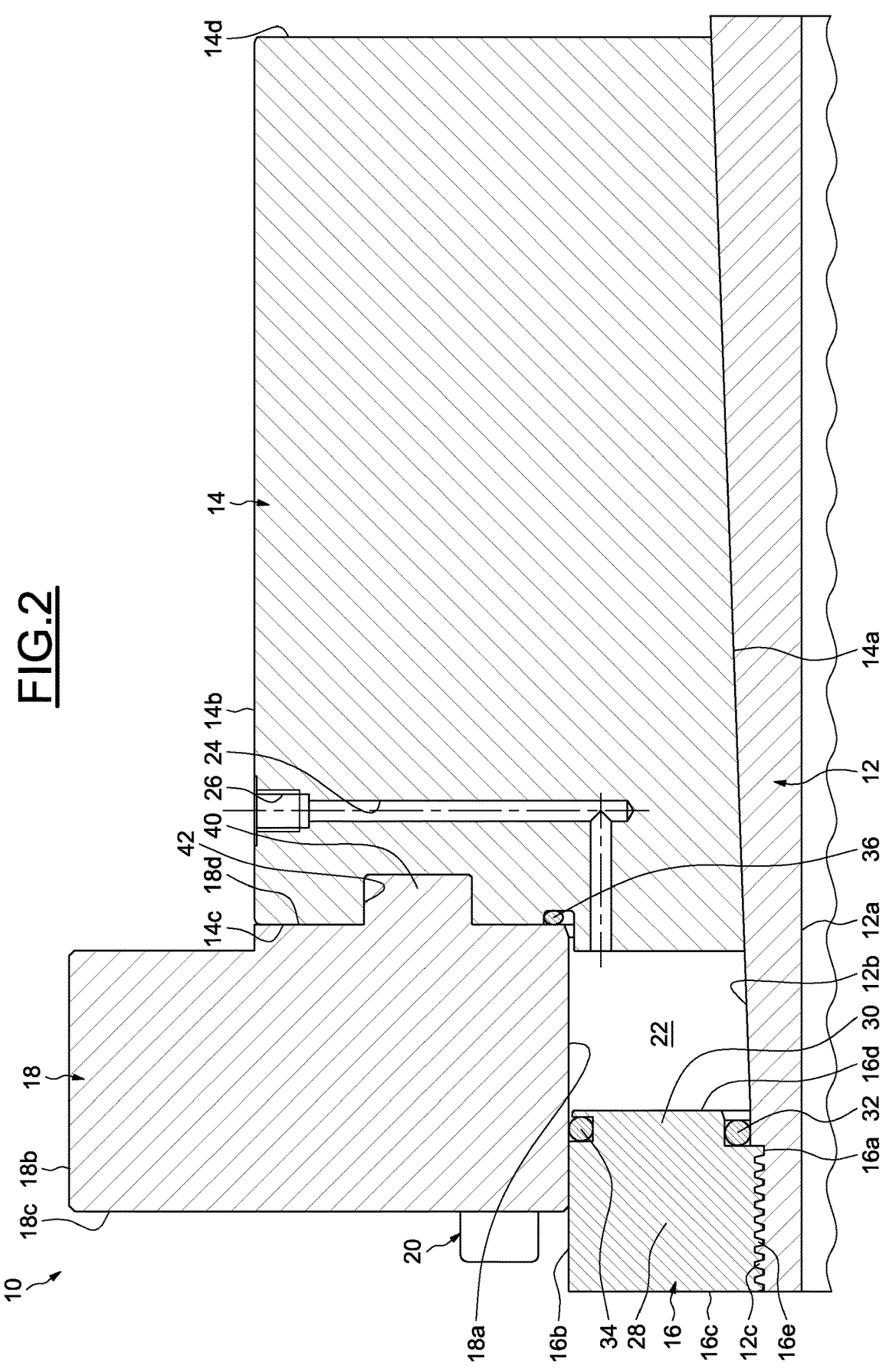

The present invention and its advantages will be better understood by studying the detailed description of specific embodiments given by way of non-limiting examples and illustrated by the appended drawing on which:

FIG. 1 is a partial cross-section of a hydraulic coupling device according to a first embodiment of the invention, and FIG. 2 is a partial cross-section of a hydraulic coupling device according to a second embodiment of the invention.

DETAILED DESCRIPTION

The hydraulic coupling device 10 illustrated on FIG. 1 comprises an annular inner sleeve 12, an annular outer sleeve 14 mounted on the inner sleeve 12, and an annular piston or nut 16 screwed on the inner sleeve 12.

As will be described hereinafter, the device 10 further comprises an annular cylinder 18 made separately from the outer sleeve 14 and secured thereto.

The inner sleeve 12 comprises a cylindrical inner surface or bore 12a and a tapered outer surface 12b which is radially opposite to the bore 12a. The inner sleeve 12 is also provided at one axial end with an outer thread 12c extending radially outward. In the illustrated example, the outer thread 12c extends radially inward with regard to the tapered outer surface 12b.

The outer sleeve 14 comprises a tapered inner surface 14a complementary to the shape of the tapered outer surface 12b of the inner sleeve and mounted onto the tapered outer surface 12b. The outer sleeve 14 also comprises an outer surface 14b which is radially opposite to the tapered inner surface 14a. The outer sleeve 14 further comprises first and second opposite frontal faces 14c, 14d which axially delimit the tapered inner surface 14a and the outer surface 14b.

As previously mentioned, the cylinder 18 is formed separately from the outer sleeve 14 and meets the outer sleeve 14 at a joint. The cylinder 18 radially surrounds the portion of the tapered outer surface 12b of the inner sleeve 12 that is not covered by the outer sleeve 14. The cylinder 18 also radially surrounds at least part of the nut 16. The cylinder 18 protrudes axially with respect to the frontal face 14c of the outer sleeve and radially with respect to the outer surface 14b of the outer sleeve. The nut 16 is located partly inside the cylinder 18. Alternatively, the nut 16 may be fully engaged into the cylinder 18. A slight radial clearance is provided between the nut 16 and the cylinder 18.

The cylinder 18 is mounted axially against the frontal face 14c of the outer sleeve 14 and is secured to the outer sleeve 14. In the illustrated example, the device 10 comprises a plurality of fixing screws 20 to secure the cylinder 18 to the outer sleeve 14. The screws 20 are spaced apart in the circumferential direction, preferably regularly. The screws 20 extend axially through the cylinder 18. Each screw 20 is engaged inside a threaded hole (not shown) formed in the frontal face 14c of the outer sleeve.

The cylinder 18 comprises a cylindrical inner surface or bore 18a and a outer surface 18b which is radially opposite to the bore 18a. The outer surface 18b is radially offset outwards with respect to the outer surface 14b of the outer sleeve.

The cylinder 18 also comprises first and second opposite frontal faces 18c, 18d which axially delimit the bore 18a and the outer surface 18b. The frontal face 18d axially abuts against the frontal face 14c of the outer sleeve.

As will be described later, a high friction coating 23 is provided on the frontal face 18d of the cylinder. The coating 23 has a coefficient friction higher than that of the frontal face 18d.

The nut 16 also comprises a cylindrical inner surface or bore 16a and a cylindrical outer surface 16b which is radially opposite to the bore 16a. The nut 16 further comprises first and second opposite frontal faces 16c, 16d which axially delimit the bore 16a and the outer surface 16b.

As previously mentioned, a slight radial clearance is provided between the nut 16 and the cylinder 18. This radial clearance is provided between the outer surface 16b of the nut and the bore 18a of the cylinder. The bore 16a of the nut is provided with an inner thread 16e engaged with the outer thread 12c of the inner sleeve.

The nut 16, the outer sleeve 14, the inner sleeve 12 and the cylinder 18 delimit together an annular hydraulic chamber 22. The chamber 22 is axially delimited by the nut 16 and the outer sleeve 14. More precisely, the chamber 22 is axially delimited by the frontal face 16d of the nut and the frontal face 14c of the outer sleeve. The chamber 22 is radially delimited by the inner sleeve 12 and the cylinder 18. More precisely, the chamber 22 is radially delimited by the bore 18a of the cylinder and the tapered outer surface 12b of the inner sleeve.

The chamber 22 is configured to be filed by oil or a similar liquid. To this end, an injection conduit 24 is provided into the thickness of the outer sleeve 14. A first end of the injection conduit 24 opens into the chamber 22. The injection conduit 24 opens onto the frontal face 14c of the outer sleeve. An injection hole 26 is provided on the outer surface 14b of the outer sleeve and is connected to a second end of the injection conduit 24 which is opposite to the first end. Alternatively, the injection conduit 24 and the injection hole 26 may be provided on the nut 16 or on the piston 18.

The outer sleeve 14 is also provided with additional injection conduits (not shown) in order to be able to build up an oil film between the tapered outer and inner surfaces 12b, 14a of the inner and outer sleeves.

In the illustrated example, the nut 16 comprises a main portion 28 and a nose 30 having a reduced outer diameter and protruding axially towards the outer sleeve 14. In the illustrated example, the main portion 28 and the nose 30 are made in one part. Alternatively, the nose 30 may be made separately from the main portion 28. The main portion 28 of the nut delimits the bore 16a, the outer surface 16b and the frontal face 16c. The nose 30 delimits the frontal face 16d.

The device 10 further comprises a first annular seal 32 radially interposed between the outer surface 12b of the inner sleeve and the nose 30 of the nut, and a second seal 34 radially interposed between the bore 18a of the cylinder 18 and the nose. The seal 32 radially comes into contact with the nut 30 and the outer surface 12b of the inner sleeve. The seal 32 may come into contact with a cylindrical or tapered portion of the outer surface 12b. The seal 34 radially comes into contact with the nut 30 and the bore 18a of the cylinder 18. The seals 32, 34 do not protrude with respect to the frontal face 16d of the nut. In the illustrated example, the seals 32, 34 have a circular cross-section. Alternatively, the seals 32, 34 may have other shapes.

The device 10 further comprises an additional seal 36 axially between the outer sleeve 14 and the cylinder 18. The seal 36 is provided axially between the frontal face 14c of the outer sleeve and the frontal face 18d of the cylinder.

The seals 32, 34, 36 are provided to avoid an escape of oil from the chamber 22 between the nut 16 and the inner sleeve 12, the nut and the cylinder 18, and between the cylinder and the outer sleeve 14, respectively.

As previously mentioned, the coating 23 is provided on the frontal face 18d of the cylinder. The coating 23 has a coefficient friction higher than that of the frontal face 18d. The coating 23 may be sprayed on the frontal face 18d. In the illustrated example, the coating 23 partly covers the frontal face 18*d*. The coating 23 covers only the portion of this frontal face which comes axially into contact with the frontal face 14*c* of the outer sleeve. The coating 23 is in axial contact with the frontal face 14*c*. Alternatively, the coating 23 may cover the entire frontal face 18*d* of the cylinder.

The friction coefficient of the coating 23 is at least equal to 0.3, and preferably at least equal to 0.45. For example, the friction coefficient may range between 0.3 and 0.6. The hardness of the coating 23 may be at least equal to 700 HV. For example, the surface roughness of the coating 23 ranges between 3 μm and 4 μm. The thickness of the coating 23 ranges between 0.02 mm and 0.04 mm. In one embodiment, the coating 23 may be a tungsten carbide coating. Alternatively, it is possible to foresee other friction increasing coatings. The coating may be applied with a plasma spraying technology.

In this example, the coating 23 is provided on the frontal face 18*d* of the cylinder. Alternatively, the coating 23 may be provided on the frontal face 14*c* of the outer sleeve. The coating 23 may cover the entire frontal face 14*c* or may cover only the portion of this frontal face which comes axially into contact with the frontal face 18*d* of the cylinder. In such alternative embodiment, the coating 23 is in axial contact with the frontal face 18*d* of the cylinder.

Alternately, the coating may also be provided both on the frontal face 18*d* of the cylinder and on the frontal face 14*c* of the outer sleeve. In this case, the coatings axially come into contact each other.

The example shown on FIG. 2, in which identical parts are given identical references, differs from the previous example in that the frontal face 18*d* of the cylinder comprises a plurality of protrusions 40 which protrude into complementary recesses 42 formed in the frontal face 14*c* of the outer sleeve.

The protrusions 40 are spaced apart in the circumferential direction, preferably regularly. Each protrusion 40 extends axially. Each protrusion 40 is engaged into one of the recesses 42 of complementary shape. In the illustrated example, the protrusions 40 are made in one part with the cylinder. The shape of each recess 42 formed on the frontal face 14*c* of the outer sleeve is complementary to that of the associated protrusion 40 of the cylinder. Each recess 42 extends axially inwards from the frontal face 14*c*.

Each protrusion 40 formed on the cylinder is located inside the associated recess 42 formed on the outer sleeve. Each protrusion 40 is entirely housed inside the associated recess 42. The protrusions 40 and the recesses 42 form a permanent mechanical clutch that couples the cylinder 18 and the outer sleeve 14 by interference fit.

In the illustrated example, the protrusions 40 are formed on the frontal face 18*d* of the cylinder, and the recesses 42 are formed on the frontal face 14*c* of the outer sleeve. Alternatively, it is possible to use a reversed arrangement with the protrusions 40 formed on the frontal face 14*c* of the outer sleeve and the recesses 42 formed on the frontal face 18*d* of the cylinder. In another embodiment, protrusions may be formed both on the frontal face 18*d* and the frontal face 14*c* and each protrude into a recess formed on the frontal face 14*c* or on the frontal face 18*d*.

In another embodiment, protrusions on the frontal face 18*d* of the cylinder and/or on the frontal face 14*c* of the outer sleeve could be used together with the coating as previously described covering at least one of these frontal faces.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved hydraulic coupling devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A hydraulic coupling device comprising:
an inner sleeve having a tapered outer surface,
an outer sleeve having a tapered inner surface mounted on the tapered outer surface of the inner sleeve,
a nut screwed onto the inner sleeve, and
a cylinder formed separately from the outer sleeve and secured to the outer sleeve, the cylinder having a frontal face axially abutting against a frontal face of the outer sleeve to form a joint,
wherein at least part of the nut extends into the cylinder,
wherein a surface of the cylinder forms a first wall of a chamber, a surface of the nut forms a second wall of the chamber and a surface of the outer sleeve forms a third wall of the chamber,
wherein the chamber is fillable with a hydraulic fluid,
wherein the chamber is radially defined by the tapered outer surface of the inner sleeve and the surface of the cylinder and axially defined by the surface of the nut and the surface of the outer sleeve,
wherein the cylinder, the nut and the outer sleeve are configured such that a fluid pressure increase in the chamber presses the outer sleeve axially away from the nut, and
wherein a) the frontal face of the cylinder and/or the frontal face of the outer sleeve is provided with a coating having a coefficient of friction higher than a coefficient of friction of the frontal face of the cylinder and the coefficient of friction of the frontal face of the outer sleeve, and/or b) at least one protrusion extends from the frontal face of the cylinder into a complementary recess in the frontal face of the outer sleeve or at least one protrusion extends from the frontal face of the outer sleeve into a complementary recess in the cylinder.

2. The device according to claim 1,
wherein the cylinder is formed of a first material and the outer sleeve is formed from a second material different than the first material.

3. The device according to claim 1,
wherein the cylinder protrudes radially outwards with respect to a radially outermost surface of the outer sleeve.

4. The device according to claim 1,
wherein the nut comprises a main portion having a first radial width and a nose having a second radial width less than the first radial width, the nose protruding axially towards the outer sleeve.

5. The device according to claim 4, further comprising:
a first seal radially interposed between the inner sleeve and the nose, and
a second seal radially interposed between the cylinder and the nose.

6. The device according to claim 5, further comprising:
a third seal axially interposed between the outer sleeve and the cylinder.

7. The hydraulic coupling device according to claim 1,
wherein the frontal face of the cylinder includes at least one protrusion extending into a complementary recess in the frontal face of the outer sleeve or the frontal face of the outer sleeve includes a at one protrusion extending into a complementary recess in the cylinder.

8. The device according to claim 7,
wherein the frontal face of the cylinder and/or the frontal face of the outer sleeve is provided with a coating having a coefficient of friction higher than a coefficient of friction of the frontal face of the cylinder and the coefficient of friction of the frontal face of the outer sleeve.

9. The device according to claim 8,
wherein the coefficient of friction of the coating is greater than or equal to 0.3.

10. The device according to claim 8,
wherein the coefficient of friction of the coating is greater than or equal to 0.45.

11. The device according to claim 7,
wherein the cylinder protrudes radially outwards with respect to a radially outermost surface of the outer sleeve.

12. The device according to claim 7,
wherein the nut comprises a main portion having a first radial width and a nose having a second radial width less than the first radial width, the nose protruding axially towards the outer sleeve.

13. The device according to claim 12, further comprising:
a first seal radially interposed between the inner sleeve and the nose, and
a second seal radially interposed between the cylinder and the nose.

14. The device according to claim 1,
wherein the nut includes a main portion having a first outer diameter and a nose having a second outer diameter less than the first outer diameter,
wherein a first seal is radially interposed between the inner sleeve and the nose, wherein a second seal is radially interposed between the cylinder and the nose,
wherein a third seal is axially interposed between the outer sleeve and the cylinder,
wherein the cylinder is made of a material different from a material of the outer sleeve,
wherein the cylinder protrudes radially outwards with respect to a radially outermost surface of the outer sleeve, and
wherein the nose extends axially from the main portion towards the outer sleeve.

15. The device according to claim 1,
wherein the tapered outer surface of the inner sleeve forms a fourth wall of the chamber,
wherein the second wall of the chamber extends radially and faces the third wall of the chamber, and
wherein the first wall of the chamber faces the fourth wall of the chamber.

16. The device according to claim 15,
including an injection conduit having a first end opening into the chamber and a second end opening located in an outer surface of the device.

17. The device according to claim 16,
wherein the outer surface of the device comprises a radially outermost surface of the outer sleeve, and
wherein the first end of the injection conduit is located in the third wall of the chamber.

18. The device according to claim 16,
wherein the pressure increase in the chamber is caused by a fluid output from the first end of the injection conduit filling the chamber, and
wherein the chamber is configured such that the fluid contacts the first wall of the chamber and the second wall of the chamber and the third wall of the chamber when the chamber is filled with the fluid.

19. The device according to claim 1,
wherein the chamber is filled with a fluid, and
wherein the first wall of the cylinder is directly contacted by the fluid.

20. The device according to claim 1,
including an injection conduit having a first end opening into the chamber and a second end opening located in an outer surface of the device.

* * * * *